United States Patent
Meng et al.

(10) Patent No.: US 12,074,767 B2
(45) Date of Patent: Aug. 27, 2024

(54) DATA PROCESSING METHOD AND DEVICE FOR COOPERATING WITH AN ARTIFICIAL INTELLIGENCE MANAGEMENT PLANE, ELECTRONIC DEVICE, AND STORAGE MEDIUM

(71) Applicant: ZTE CORPORATION, Guangdong (CN)

(72) Inventors: Wei Meng, Guangdong (CN); Liya Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 117 days.

(21) Appl. No.: 17/435,747

(22) PCT Filed: Mar. 5, 2020

(86) PCT No.: PCT/CN2020/077980
§ 371 (c)(1),
(2) Date: Sep. 2, 2021

(87) PCT Pub. No.: WO2020/211561
PCT Pub. Date: Oct. 22, 2020

(65) Prior Publication Data
US 2022/0052923 A1 Feb. 17, 2022

(30) Foreign Application Priority Data
Apr. 15, 2019 (CN) .......................... 201910300209.2

(51) Int. Cl.
*H04L 41/12* (2022.01)
*H04L 41/0893* (2022.01)
(Continued)

(52) U.S. Cl.
CPC .......... *H04L 41/12* (2013.01); *H04L 41/0893* (2013.01); *H04L 41/0896* (2013.01);
(Continued)

(58) Field of Classification Search
CPC . H04L 41/12; H04L 41/0893; H04L 41/0896; H04L 41/145; H04L 41/147;
(Continued)

(56) References Cited

U.S. PATENT DOCUMENTS

2018/0317134 A1* 11/2018 Leroux ............... H04L 41/0806
2018/0324207 A1    11/2018 Reybok, Jr. et al.
(Continued)

FOREIGN PATENT DOCUMENTS

| CN | 106533724 A | 3/2017 |
|---|---|---|
| WO | WO2018203780 A1 | 11/2018 |
| WO | WO 2018203780 A1 | 11/2018 |

OTHER PUBLICATIONS

European Patent Office, Extended European Search Report dated Dec. 15, 2022, for corresponding EP application No. 20791480.5.
(Continued)

*Primary Examiner* — Tonia L Dollinger
*Assistant Examiner* — Joseph M Cousins
(74) *Attorney, Agent, or Firm* — Li & Cai Intellectual Property (USA) Office

(57) ABSTRACT

A data processing method and device, a storage medium and an electronic device are disclosed. The method comprises responsive to determining that an application instance is established, generating, by an orchestrator, a data acquisition request message corresponding to the application instance and sending the data acquisition request message to a next communication node, wherein the next communication node includes one of a network control device and a target network node; acquiring, by the target network node, data according to the data acquisition request message received from the orchestrator or through the network control device, and sending a data acquisition result to a processing device of the application instance; and processing, by the process-
(Continued)

ing device of the application instance, the data acquisition result through a model in the application instance and outputting a processing result.

15 Claims, 3 Drawing Sheets

(51) Int. Cl.
*H04L 41/0896* (2022.01)
*H04L 41/14* (2022.01)
*H04L 41/147* (2022.01)
*H04L 41/16* (2022.01)

(52) U.S. Cl.
CPC .......... *H04L 41/145* (2013.01); *H04L 41/147* (2013.01); *H04L 41/16* (2013.01)

(58) Field of Classification Search
CPC ............. H04L 41/0897; H04L 41/0894; H04L 41/342; H04L 41/0631; H04L 41/16; H04W 24/04; H04W 28/16
See application file for complete search history.

(56) References Cited

U.S. PATENT DOCUMENTS

| | | | |
|---|---|---|---|
| 2019/0236485 A1* | 8/2019 | Stanley, III | H04L 67/303 |
| 2020/0044943 A1* | 2/2020 | Bor-Yaliniz | H04L 41/044 |
| 2020/0059407 A1* | 2/2020 | Lu | H04L 41/0896 |
| 2020/0228420 A1* | 7/2020 | Dao | H04L 43/08 |
| 2021/0185695 A1* | 6/2021 | Gupta | H04W 72/543 |
| 2021/0274387 A1* | 9/2021 | Kousaridas | H04W 28/24 |
| 2021/0377754 A1* | 12/2021 | Marquezan | H04L 41/14 |
| 2022/0021469 A1* | 1/2022 | Veijalainen | H04L 43/022 |

OTHER PUBLICATIONS

Experiential Networked Intelligence(ENI) dated Apr. 11, 2019.
"Framework for data handling to enable machine learning in future networks including IMT-2020", ITU-T, Rec, dated Jan. 1, 2019.
Vishnu Ram OV Independent Research Consultant India, "High-level architecture for ML in 5G and future networks", ITU-T Draft, dated Feb. 13, 2019.
Indian Patent Office, First office action dated Nov. 9, 2022, for corresponding IN application No. 202117045882.
WIPO, International Search Report issued on Apr. 24, 2020.

* cited by examiner

DATA PROCESSING METHOD AND DEVICE FOR COOPERATING WITH AN ARTIFICIAL INTELLIGENCE MANAGEMENT PLANE, ELECTRONIC DEVICE, AND STORAGE MEDIUM

The present application claims the priority of a Chinese patent application No. 201910300209.2 filed with the China National Intellectual Property Administration on Apr. 15, 2019, the entire content of which is incorporated into this application by reference.

TECHNICAL FIELD

The present application relates to the field of communications, and in particular, to a data processing method and device, a storage medium and an electronic device.

BACKGROUND

As network topologies become increasingly complex and network applications become increasingly diverse, for many enterprises, the adoption of networks lacking flexibility has become a major bottleneck hindering their business development, since it reduces the possibility of deploying powerful and responsive network infrastructures. On the other hand, for service providers, there is a need to control the operational and capital expenditures, as one focuses on the improvement of network flexibility and reliability. The service providers must then take advantage of automation to resolve time-consuming, repetitive, or error-prone tasks to improve operational efficiency, profit, and user satisfaction.

Network automation refers to the process of automatic configuration, management, testing, deployment, and operation of physical and virtual devices in a network. The network under the support of the technology can automatically execute the established tasks and functions every day. The network operations involving complex configuration and device management can be simplified through collaboration, automation, and network orchestration to accommodate business flexibility in a changing environment.

The network is increasingly complex, and the data generated by the network system also has the characteristics of diversity, multi-dimensionality, non-structuralization and the like. Since the data of the same business may have correlation, the traditional manual analysis processing mode has low efficiency and high cost, and the rule-based automatic processing mode has a narrow application range, is not flexible enough and has low accuracy. With the rise of big data and artificial intelligence, more and more intelligent analysis algorithms are also applied to the field of operation and maintenance. The system and the method play a great role in the aspects of problem positioning, flow prediction, decision assistance, intelligent alarm, automatic fault recovery and the like by analyzing mass data owned and generated by the operation and maintenance system, thereby further reducing the operation and maintenance cost.

When the big data and artificial intelligence technologies are introduced into network operation and maintenance management, the network in the related art does not have any concrete implementation schemes such as how to acquire network data and how to cooperate with an artificial intelligence management plane.

SUMMARY

Embodiments of the disclosure provide a data processing method and device, a storage medium and an electronic device, which at least solve the problems that in the related technology, when big data and an artificial intelligence technology are introduced into network operation and maintenance management, network architecture cannot acquire network data and cooperate with an artificial intelligence management plane.

According to an embodiment of the present disclosure, there is provided a data acquisition request method including: responsive to determining that an application instance is established, generating, by an orchestrator, a data acquisition request message corresponding to the application instance and sending the data acquisition request message to a next communication node, wherein the next communication node includes one of a network control device and a target network node; acquiring, by the target network node, data according to the data acquisition request message received from the orchestrator or through the network control device, and sending a data acquisition result to a processing device of the application instance; and processing, by the processing device of the application instance, the data acquisition result through a model in the application instance and outputting a processing result.

According to another embodiment of the present disclosure, there is provided a data processing device including: a transmission module, provided in an orchestrator, and configured to generate a data acquisition request message corresponding to the application instance and send the data acquisition request message to a next communication node, wherein the next communication node includes one of a network control device and a target network node; an acquisition module, provided at the target network node, and configured to acquire data according to the data acquisition request message received from the orchestrator or via the network control device and send a data acquisition result to a processing device of the application instance; and a processing module, provided in the processing device of the application instance, and configured to process the data acquisition result through a model in the application instance and output a processing result.

According to a further embodiment of the present disclosure, there is also provided a storage medium storing a computer program, wherein the computer program is configured to perform any one of the above method embodiments when executed.

According to yet another embodiment of the present disclosure, there is also provided an electronic device, comprising a memory in which a computer program is stored and a processor configured to execute the computer program to perform any one of the above method embodiments.

According to the disclosure, after the application instance on the artificial intelligence management plane is established, the corresponding acquisition request is generated and sent to the network side. Therefore, the problem that network data cannot be acquired and the cooperation with the artificial intelligence management plane cannot be achieved through network architecture can be solved. Meanwhile, the automation, intellectualization and closed-loop control of the network can be effectively realized.

DETAILED DESCRIPTION

The present application will be described in detail hereinafter with reference to the accompanying drawings in conjunction with embodiments.

The terms "first", "second" and the like in this disclosure are used for distinguishing between similar elements and not necessarily for describing a particular sequential or chronological order.

First Embodiment

In this embodiment, there is provided a method for requesting data acquisition.

Figure 1:
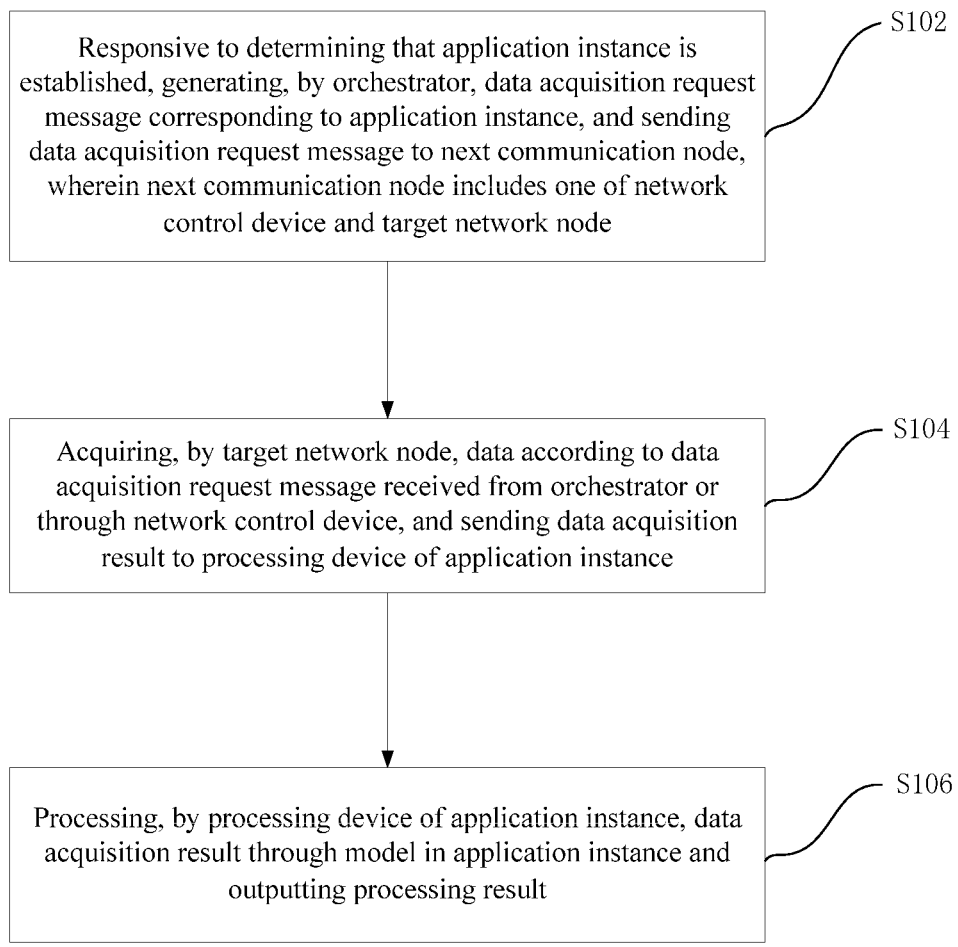
FIG. 1 is a flow chart of a method of processing data according to an embodiment of the disclosure.

FIG. 1 is a flowchart of the request method of data acquisition according to the embodiment of the present disclosure. As shown in FIG. 1, the flowchart includes steps of:

Step S102, responsive to determining that an application instance is established, generating, by an orchestrator, a data acquisition request message corresponding to the application instance, and sending the data acquisition request message to a next communication node, wherein the next communication node includes one of a network control device and a target network node;

Step S104, acquiring, by the target network node, data according to the data acquisition request message received from the orchestrator or through the network control device, and sending a data acquisition result to a processing device of the application instance; and Step S106, processing, by the processing device of the application instance, the data acquisition result through a model in the application instance and outputting a processing result.

Types of orchestrators include, but are not limited to, a Machine Learning Function Orchestrator (MLFO).

The orchestrator deploys application instances through an Artificial Intelligence (AI) platform. Application instance management entries are pre-established in the orchestrator, and state machines in the entries are initialized. After the application instance is successfully established, information which is successfully established is sent to an orchestrator, such that a corresponding application instance management entry in the orchestrator is activated. A state machine in the entry is set to be enabled, other information in the entry is assigned according to the condition of the instance, and a keep-alive message is sent to the processing device of the application instance at intervals to determine a use state of the instance. If the establishment of the application instance is failed, information of establishment failure is sent to the orchestrator, alarm information is sent from the orchestrator, and an automatic repair process is activated or the pre-established application instance management entry is deleted. The management entries include information such as a state machine, a position, a type, a model and algorithm combination, a life cycle, a data preprocessing algorithm and data acquisition requirements of each model of the application instance.

The network control device refers to a network orchestration or control plane at a network side, for example, a Network Slice Management Function (NSMF).

The type of target network node can also be adjusted according to the specific implementation. For example, if the orchestrator is MLFO and the network control device is NSMF, the target network node may be a Network Subnet Slice Management Function (NSSMF) element in the 5th Generation (5G) communication system, and a 5G Network Slice. For example, in the scenario of system fault detection, the target network node may also be an alarm collection platform.

Optionally, the data acquisition request message includes: location information of the application instance, network node information and data acquisition content.

Optionally, when a next communication node is the network control device, the method further includes: determining, by the network control device, the target network node for data acquisition according to the network node information in the data acquisition request message; and sending, by the network control device, the data acquisition request message to the target network node.

Since the number of the target network nodes may be one or more, the network node information has information about one or more target network nodes. In the information, the information about one or more target network nodes can be configured to instruct the network control device to send the data acquisition request message to multiple target network nodes at the same time, or can be configured to instruct the network control device to send the data acquisition request message to one or more of the multiple target network nodes, where the target network nodes serve as intermediate nodes to forward the data acquisition request message to other target network nodes. The specific number thereof is determined by the orchestrator according to the number and type of application instances and the model included in the use instance.

If there is no network control device, the orchestrator can directly send the data acquisition request message to the target network node, and the network node information at this time can also be configured to assist a network node receiving the information to judge whether the node is the target network node of the orchestrator. If the network node information is correct, the network node will perform corresponding data acquisition and can also respond to the orchestrator. If the network node information is wrong, the network node will refuse to execute data acquisition and send error response information to the orchestrator so that the orchestrator finds a suitable target network node in time.

Optionally, the method further includes: receiving, by the network control device, the processing result output from the processing device of the application instance; and configuring, by the network control device, the network according to the processing result.

Since the network control device is used for controlling the network side, after receiving the processing result output from the processing device, the network control device can optimize the network environment by means of a network configuration according to a decision of the application instance.

Optionally, the step of acquiring, by the target network node, data according to the data acquisition request message received from the orchestrator or through the network control device, includes: determining, by the target network node, an application instance needing data acquisition according to the location information of the application instance; and acquiring, by the target network node, data corresponding to the application instance.

Optionally, the step of acquiring, by the target network node, data corresponding to the application instance includes: screening, by the target network node, the data acquisition content according to a data feature set; and acquiring, by the target network node, the data of the screened data acquisition content.

Figure 2:
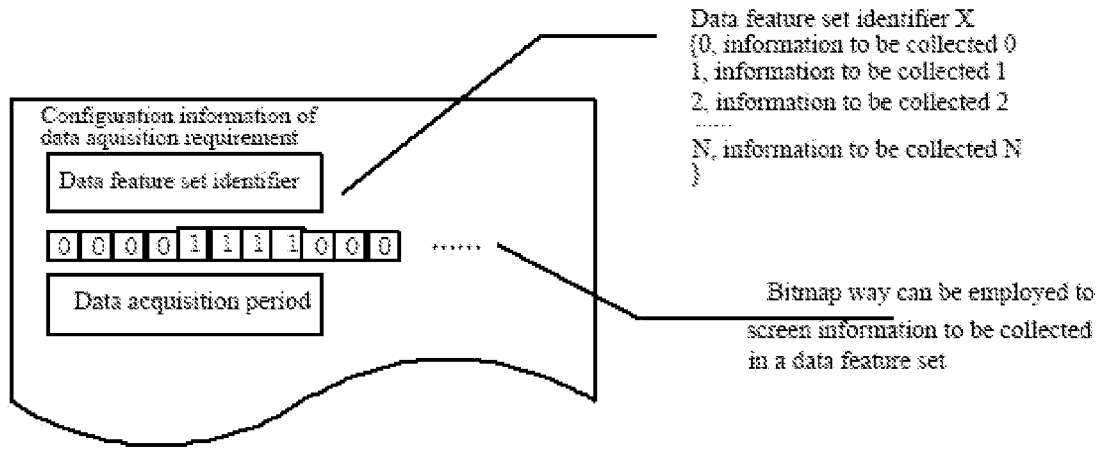
FIG. 2 is a schematic diagram of a screening of data options according to an embodiment of the disclosure.

Through a screening manner, the target network node screens out a part of data options which are suitable for the model in the application instance, avoiding the phenomenon that all the data options are collected to cause overlarge system load; for example, FIG. 2 is a schematic diagram illustrating a screening of a data option according to an embodiment of the disclosure, and as shown in FIG. 2, a bitmap way can be employed to screen information to be collected in a data feature set.

Optionally, the data feature set is determined by: determining, by an encoder, the data feature set according to a network requirement of the application instance and sending the data feature set to the next communication node, or after receiving the data acquisition request message, analyzing, by the target network node, the network requirement of the application instance corresponding to the location information of the application instance and determining the data feature set.

Optionally, the data feature set includes: network information of a network in which the target network node is located; user information of the target network node; device information of a device in which the target network node is located; and data message information of the target network node.

For each application instance, the network node sides mutually have the data feature set, and the network element equipment can acquire data according to the data feature set. The network information includes an Internet Protocol (IP) address, a Protocol number, and a port number. The user information includes: user Identifier (ID), charging attributes, the number of books used. The device information can be environmental parameters such as the fan rotation speed, the temperature and the humidity of the current device. The data message information can include: type of message, flow, delay, for example.

Optionally, the data acquisition content includes one of: the number and type of users, user session information, user traffic information, data acquisition period and network service alarm information.

Optionally, the step of processing, by the processing device of the application instance, the data acquisition result through the model in the application instance includes: sorting, by the processing device, the data acquisition result according to a type of the data acquisition result and configuring the sorted data acquisition result into a corresponding model; and processing, by the processing device, the sorted data acquisition result in the model, wherein the processing manner includes predicting the data and inferring the data.

The model is a system which is obtained by learning from existing data or experience through methods such as machine learning and deep learning and realizes functions such as specific analysis and prediction.

Each model has its established functionality. For example, some models can be configured to predict an amount of time when new users and sessions reach a required number. As another example, some models can be configured to predict the amount of time to perform slice expansion. In addition, the position of the alarm in the equipment can be determined according to the quantity or the type of the alarm information. In the meanwhile, the correlation exists among the models. For example, predicting an amount of time when new users and sessions reach a required number is used as an input of predicting the amount of time to perform slice expansion. Therefore, the models can be connected in series. The function of the specific model is dependent on the function of the application instance.

According to the result output from each model, the processing device can perform corresponding processing operation, such as filtering, screening, matching, or sorting. The processed data is continuously predicted in other models in the application instance, and a final processing result is output after inference until the processing is completed.

Prediction refers to a time, position and numerical value corresponding to resource consumption when the data acquisition content reaches the preset result. For example, it is predicted new users and sessions reach a peak number in 2 hours.

Prediction refers to an amount of time or location when or where the data acquisition content can reach a predetermined result. For example, within 2 hours, the new users and sessions reach a peak number. For another example, a flow of traffic used by a certain user on weekends is predicted to be 10G according to the user's habit.

Inference is a conclusion inferred according to the data acquisition content or the predicted result. For example, if the number of new users and sessions reach the peak within 2 hours, it is inferred that the slice expansion needs to be performed after 1.5 hours.

Of course, the above descriptions of prediction and inference are only examples. The prediction and inference processes of other types of ideas are all within the scope of this embodiment, and will not be described herein again.

Through the description of the above embodiments, it is clearly understood that the method according to the above embodiments can be implemented by software plus a necessary general hardware platform, and certainly can also be implemented by hardware, but in many cases, the former is a better implementation. Based on such understanding, the technical solution of the present application can be embodied in the form of a software product, where the computer software product is stored in a storage medium (e.g., ROM/RAM, magnetic disk, or optical disk), and includes several instructions for enabling a terminal device (which can be a mobile phone, a computer, a server, or a network device, etc.,) to execute the method according to the embodiments of the disclosure.

In order to better understand the technical solution described in the above embodiment, the following two scenarios are provided in this embodiment for understanding.

Scenario 1: the scheme of 5G core network slice utilization rate prediction and intelligent deployment is realized by applying artificial intelligence.

Figure 3:
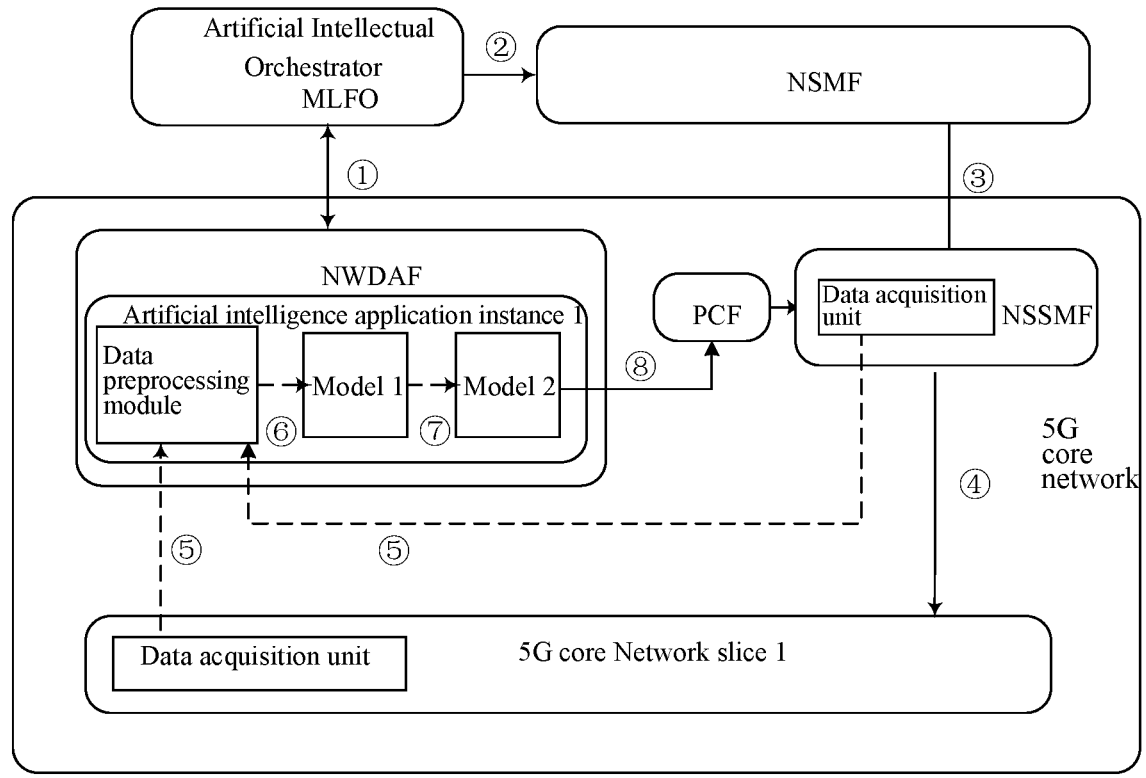
FIG. 3 is a schematic diagram based on scenario 1 according to an embodiment of the present disclosure.

FIG. 3 is a schematic diagram based on scenario 1 according to an embodiment of the present disclosure. As shown in FIG. 3, the Orchestrator is presented in the form of an MLFO (Machine Learning Function Orchestrator) in this scenario, enabling interaction with the application instance and the NSMF.

The application instance is embedded in an NWDAF (Network Data Analysis Function) element in the form of micro-service, and includes a data preprocessing module, a model 1 and a model 2, wherein the model 1 predicts the flow of traffic and the number of users in the 5G core Network slice service in the future 2 hours, and the model 2 calculates the prediction result and analyzes whether capacity expansion or capacity reduction is required.

The data acquisition device is embedded in the network element of NSSMF and 5G network slice.

In the first step, the application instance 1 (hereinafter referred to as instance 1) is successfully established in the NWDAF and notifies the MLFO; the MLFO activates the management items of the artificial intelligence instance 1, sets a state machine of the instance 1 as a running state, and sends a keep-alive message every 60 seconds to confirm the state of instance 1.

The data acquisition request message includes: IP address of instance 1 (location information of application instance), specifying data acquisition from NSSMF and 5G network slice 1 (target network element). The acquired contents include the number of existing users, session information of user, session information newly established every second, traffic information of user, timestamp, and holiday factor, for example (data acquisition requirement), and the data acquisition cycle is 100 ms.

In the second step, the MLFO sends the data acquisition request message to the NSMF.

In the third step, the NSMF analyzes the contents of the data acquisition request message and sends the IP address and data acquisition requirement of instance 1 to the designated NSSMF.

In the fourth step, the NSSMF continues to send the IP address and data acquisition requirement of instance 1 to the designated 5G network slice 1.

In the fifth step, according to data acquisition requirement, the NSSMF and 5G network slice 1 acquire information including the number of users, user session information, session information newly established very second, user traffic information, timestamp and holiday factor, and send the above information to application instance 1.

In the sixth step, a data preprocessing module sorts the data and sends the data to a model 1.

In the seventh step, the model 1 predicts that the number of new users and sessions will reach a peak in the future 2 hours and sends the predicted value to model 2; and the model 2 analyzes that the slice expansion is required after 1.5 hours according to the predicted result from the model 1.

In the eighth step, the model 2 sends the relevant capacity expansion decision to a Policy Control Function (PCF), and the PCF sends the corresponding network management policy to the NSSMF to execute the capacity expansion plan.

Scenario 2: the artificial intelligence is applied to a network root cause analysis system, and accurate positioning and tracing of faults are achieved through model inference.

Figure 4:
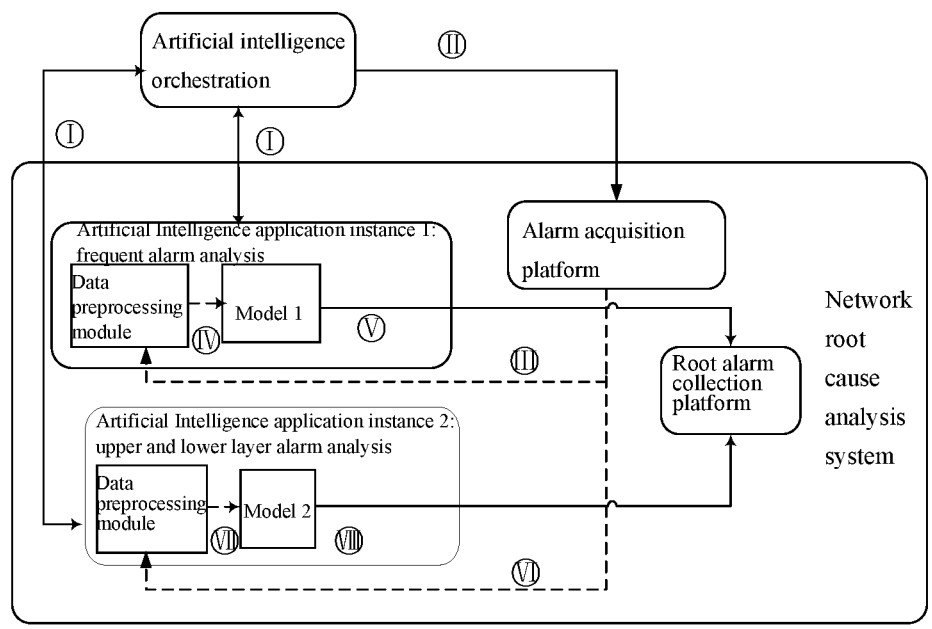
FIG. 4 is a schematic diagram based on scenario 2 according to an embodiment of the disclosure.

FIG. 4 is a schematic diagram based on scenario 2 according to an embodiment of the present disclosure. As shown in FIG. 4, the application instance 1 is applied to frequent alarm analysis, that is, if a certain number of specific alarms and specific events occur within a certain time, a certain correlation between the alarms and the events can be considered.

The application instance 2 is applied to upper and lower layered alarm analysis, namely, the influence of service faults of upper and lower layers of the same professional network is reflected in that a certain root cause alarm brings a large-area phenomenon alarm, and the root cause alarm causing the fault needs to be quickly obtained.

In the first step, an application instance 1 (hereinafter referred to as instance 1) and an application instance 2 (hereinafter referred to as instance 2) are successfully established in a network root cause analysis system, which is informed to an orchestrator; the orchestrator activates the management entries of the artificial intelligence instances 1 and 2, and sets state machines of the instances 1 and 2 to be a running state, and sends a keep-alive message every 60 seconds to confirm the status of instances 1 and 2.

The data acquisition request message of instance 1 includes: IP address of instance 1 (location information of application instance) with an alarm acquisition platform used as the target network element. The acquired contents include alarm information of all devices (data acquisition requirements) and the data acquisition cycle is trigger to report.

The data acquisition request message of instance 2 includes: the IP address of instance 2 (location information of application instance) with the alarm acquisition platform used as the target network element. The acquired contents include alarm information of all network services (data acquisition requirements) and the data acquisition cycle is trigger to report.

In the second step, the orchestrator sends the two data acquisition request messages to the alarm acquisition platform.

In the third step, the alarm acquisition platform receives the alarm information, finds that the alarm is from a device, the content of which is "the temperature of the single board B of the network element A is too high", and sends the alarm to the application instance 1.

The alarm acquisition platform receives 100 same alarms as described above within 2 minutes, and then the alarm acquisition platform sends all the alarms to application instance 1.

In the fourth step, the application instance 1 receives the alarm information, and the data preprocessing module filters, screens, matches, and sorts the alarm information and then sends the alarm information to a model 1.

In the fifth step, the model 1 analyzes and infers such a state where the same 100 alarms are received within 2 minutes, and considers that the alarm may be caused by the temperature rise of the single board due to the inferior environment temperature and humidity.

Application instance 1 merges these alarms and sends an inference result to a root cause alarm collect platform.

In the sixth step, the alarm acquisition platform receives the alarm information, finds that the alarm is from network, the contents of which are "link interruption of T-Multiprotocol Label Switching Section (TMS)", "link interruption of B tunnel", "link interruption of pseudo wire C", "service interruption of D business", "alarm of E optical fiber Loss Signal (LOS)" and sends the alarm to the application instance 2.

In the seventh step, the application instance 2 receives the alarm information, and the data preprocessing module filters, screens, matches, and sorts the alarm information and then sends the alarm information to a model 2.

In the eighth step, the model 2 determines that the alarms occur due to the same reason by analyzing the alarm information, namely "E optical fiber is broken and a port of the optical fiber reports an LOS alarm".

The application instance 2 sends the inference result to the root cause alarm collect platform.

Scenario 3: data screening on a preselected data feature set.

In this embodiment, Table 1 is provided for understanding intelligent traffic engineering of the bearer network. Numbers in Table 1 represent feature numbering identifiers, i.e., 0-12, and texts below the numbering identifiers represent types of features. The specific table is as follows:

TABLE 1

| 0 | 1 | 2 | 3 |
|---|---|---|---|
| Routing attributes | Routing entry | Virtual Private Network (VPN) information | Number of users |
| 4 | 5 | 6 | 7 |
| Instantaneous user increment | IP address resource utilization | NAT session entry | Firewall session entries |
| 8 | 9 | 10 | 11 |
| Instantaneous traffic of main path | Instantaneous traffic of backup path | Traffic delay of main path | Traffic delay of backup path |
| 12 | | | |
| Node Quality of Service (QoS) configuration | | | |

Aiming at the network traffic engineering characteristic of interactive network, the orchestrator acquires eight data acquisition functions numbered 0, 1, 2, 3, 8, 9, 10, and 11. The orchestrator therefore configures the eight data acquisition functions described above into a data feature set.

After receiving the data feature set, the target network node acquires the data for 0, 1, 2, 3, 8, 9, 10, and 11 via the network control device.

Or, the target network node acquires the eight data acquisition functions numbered 0, 1, 2, 3, 8, 9, 10, and 11 according to the network traffic engineering characteristics of the network where the target network node is located, and performs data acquisition.

Second Embodiment

In this embodiment, there is provided a device for requesting data acquisition, which is configured to implement the embodiments and optional implementations as set forth above, and details of which that have been discussed will not be described again. As used below, the term "module" can be a combination of software and/or hardware that implements a predetermined function. Although the device described in the embodiments below are preferably implemented in form of software, an implementation in hardware or a combination of software and hardware is also possible and conceived.

Figure 5:
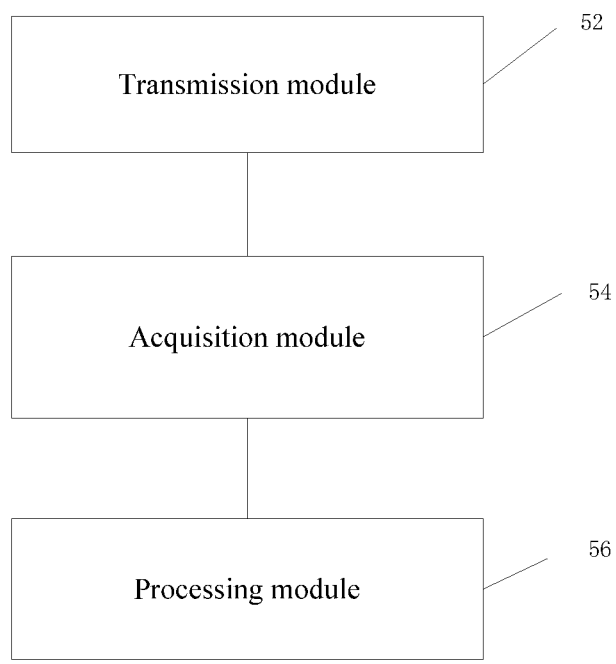
FIG. 5 is a block diagram of a data processing device according to an embodiment of the present disclosure.

FIG. 5 is a block diagram of a data processing device according to an embodiment of the present disclosure. As shown in FIG. 5, the device includes:

a transmission module 52, provided in an orchestrator, and configured to generate a data acquisition request message corresponding to an application instance and send the data acquisition request message to a next communication node, wherein the next communication node includes a network control device and a target network node; an acquisition module 54, provided at the target network node, and configured to acquire data according to the data acquisition request message received from the orchestrator or via the network control device and send a data acquisition result to a processing device of the application instance; and a processing module 56, provided in the processing device of the application instance, and configured to process the data acquisition result through a model in the application instance and output a processing result.

The above modules can be implemented in the form of software or hardware, and the latter can be implemented by, but not limited to, the modules all arranged in the same processor or the modules arranged in different processors in any combination.

Third Embodiment

According to an embodiment of the present disclosure, there is further provided a storage medium having a computer program stored therein, wherein the computer program is configured to perform the steps in any one of the method embodiments as described above when executed.

Optionally, in this embodiment, the storage medium can be configured to store a computer program for executing steps of:

S1, responsive to determining that an application instance is established, generating, by an orchestrator, a data acquisition request message corresponding to the application instance and sending the data acquisition request message to a next communication node, wherein the next communication node includes one of a network control device and a target network node; S2, acquiring, by the target network node, data according to the data acquisition request message received from the orchestrator or through the network control device, and sending a data acquisition result to a processing device of the application instance; and S3, processing, by the processing device of the application instance, the data acquisition result through a model in the application instance and outputting a processing result.

Optionally, in this embodiment, the storage medium can include but is not limited to various media capable of storing computer programs, such as a Universal Serial Bus (USB) disk, a Read-Only Memory (ROM), a Random-Access Memory (RAM), a removable hard disk, a magnetic disk, or an optical disk.

According to an embodiment of the present disclosure, there is further provided an electronic device, including a memory in which a computer program is stored and a processor configured to execute the computer program to perform the steps in any one of the above method embodiments.

Optionally, the electronic device can further include a transmission device and an input/output device, wherein the transmission device is connected to the processor, and the input/output device is connected to the processor.

Optionally, in this embodiment, the processor can be configured to execute, by the computer program, steps of:

S1, responsive to determining that an application instance is established, generating, by an orchestrator, a data acquisition request message corresponding to the application instance and sending the data acquisition request message to a next communication node, wherein the next communication node includes one of a network control device and a target network node; S2, acquiring, by the target network node, data according to the data acquisition request message received from the orchestrator or through the network control device, and sending a data acquisition result to a processing device of the application instance; and S3, processing, by the processing device of the application instance, the data acquisition result through a model in the application instance and outputting a processing result.

Optionally, for specific examples in this embodiment, reference can be made to the examples described in the above embodiments and optional implementations, and will not be described herein again.

The modules or steps of the application as described above can be implemented by a general purpose computing device. They can be centralized on a single computing device or distributed over a network of multiple computing devices, and alternatively, they can be implemented by program code executable by a computing device, such that they are stored in a memory device and executed by the computing device. In some cases, the steps as shown or described can be executed in a sequence different from that described herein, or they can be separately fabricated as individual integrated circuit modules, or multiple ones of them can be fabricated as a single integrated circuit module. Thus, the present application is not limited to any specific combination of hardware and software.

What is claimed is:

1. A data processing method for cooperating with an artificial intelligence management plane, comprising:
    responsive to determining that an application instance on the artificial intelligence management plane is established, generating, by an orchestrator, a data acquisition request message corresponding to the application instance and sending the data acquisition request message to a next communication node, wherein the next communication node includes one of a network control device and a target network node;
    acquiring, by the target network node, data according to the data acquisition request message received from the orchestrator or through the network control device, and sending a data acquisition result to a processing device of the application instance; and
    processing, by the processing device of the application instance, the data acquisition result through a model in the application instance and outputting a processing result,
    wherein the orchestrator is provided with an application instance management entry, and the application instance management entry in the orchestrator is activated in response to receiving, by the orchestrator, information of successfully establishing the application instance.

2. The method according to claim 1, wherein in the case where the next communication node is the network control device, the method further comprises:
    determining, by the network control device, the target network node for data acquisition according to the network node information in the data acquisition request message; and
    sending, by the network control device, the data acquisition request message to the target network node.

3. The method according to claim 2, further comprising:
    receiving, by the network control device, the processing result output from the processing device of the application instance; and
    configuring, by the network control device, the network according to the processing result.

4. The method according to claim 1, wherein the step of acquiring, by the target network node, data corresponding to the application instance comprises:
    screening, by the target network node, the data acquisition content according to a data feature set; and
    acquiring, by the target network node, the data of the screened data acquisition content.

5. The method according to claim 4, wherein the data feature set is determined by:
    determining, by an encoder, the data feature set according to a network requirement of the application instance and sending the data feature set to the next communication node, or
    after receiving the data acquisition request message, analyzing, by the target network node, the network requirement of the application instance corresponding to the location information of the application instance and determining the data feature set.

6. The method according to claim 5, wherein the data feature set comprises:
    network information of a network in which the target network node is located;
    user information of the target network node;
    device information of a device in which the target network node is located; and
    data message information of the target network node.

7. The method according to claim 6, wherein the data acquisition content comprises one of: the number and type of users, user session information, user traffic information, data acquisition period and network service alarm information.

8. The method according to claim 5, wherein the data acquisition content comprises one of: the number and type of users, user session information, user traffic information, data acquisition period and network service alarm information.

9. The method according to claim 4, wherein the data acquisition content comprises one of: the number and type of users, user session information, user traffic information, data acquisition period and network service alarm information.

10. The method according to claim 1, wherein the step of processing, by the processing device of the application instance, the data acquisition result through the model in the application instance, comprises:
    sorting, by the processing device, the data acquisition result according to a type of the data acquisition result and configuring the sorted data acquisition result in a corresponding model; and
    processing, by the processing device, the sorted data acquisition result in the model, wherein the processing includes predicting the data and inferring the data.

11. The method according to claim 1,
    wherein the data acquisition request message comprises: location information of the application instance, network node information and data acquisition content.

12. The method according to claim 11,
wherein the step of acquiring, by the target network node, data according to the data acquisition request message received from the orchestrator or through the network control device, comprises:
determining, by the target network node, an application instance needing data acquisition according to the location information of the application instance; and
acquiring, by the target network node, data corresponding to the application instance.

13. A non-transitory storage medium storing a computer program, wherein the computer program is configured to perform the data processing method according to claim 1 when executed.

14. An electronic device, comprising a memory and a processor, wherein the memory stores a computer program, and the processor is configured to execute the computer program to perform the data processing method according to claim 1.

15. A data processing device for cooperating with an artificial intelligence management plane, comprising:
   a first processor, provided in an orchestrator, and configured to, responsive to determining that an application instance on the artificial intelligence management plane is established, generate a data acquisition request message corresponding to the application instance and send the data acquisition request message to a next communication node, wherein the next communication node includes one of a network control device and a target network node;
   a second processor, provided at the target network node, and configured to acquire data according to the data acquisition request message received from the orchestrator or via the network control device and send a data acquisition result to a processing device of the application instance; and
   a third processor, provided in the processing device of the application instance, and configured to process the data acquisition result through a model in the application instance and output a processing result,
wherein the orchestrator is provided with an application instance management entry, and the application instance management entry in the orchestrator is activated in response to receiving, by the orchestrator, information of successfully establishing the application instance.

\* \* \* \* \*